United States Patent [19]

Straub et al.

[11] Patent Number: 4,517,614
[45] Date of Patent: May 14, 1985

[54] MECHANISM FOR EXTRACTING TAPE FROM A TAPE CARRIER

[75] Inventors: Albert M. Straub, Howell; Theodore R. Mabrey; Daniel L. Vokovich, both of Ann Arbor, all of Mich.

[73] Assignee: Northern Telecom Limited, Montreal, Canada

[21] Appl. No.: 393,591

[22] Filed: Jun. 30, 1982

[51] Int. Cl.³ .................................... G11B 15/66
[52] U.S. Cl. .................................... 360/85; 360/95
[58] Field of Search .................................... 360/85, 95

[56] References Cited

U.S. PATENT DOCUMENTS

| 3,692,255 | 9/1972 | Von Behren . |
| 3,702,383 | 11/1972 | Inaga ........................... 360/85 |
| 3,860,960 | 1/1975 | Akamine . |
| 4,045,820 | 8/1977 | Staar . |
| 4,092,686 | 5/1978 | Schulz . |
| 4,258,399 | 3/1981 | Iijima et al. . |
| 4,275,424 | 6/1981 | Maxey . |

OTHER PUBLICATIONS

IBM Technical Disclosure Bulletin, "Automatic Tape Threading", by R. B. Johnson et al., vol. 9, No. 8, Jan. 1967, p. 968.

Primary Examiner—A. J. Heinz
Attorney, Agent, or Firm—Schwartz, Jeffery, Schwaab, Mack, Blumenthal & Koch

[57] ABSTRACT

A mechanism for withdrawing magnetic recording tape from a tape carrier (e.g. a cartridge) is disclosed. A boom member supports at least two levers. In the at rest (unengaged) position, rollers, supported by the levers, are positioned in a recess in the tape cartridge and are positioned interior of the tape. When activated, the boom member pivots about its pivot point, thus moving the levers attached to it. The levers move generally away from the cartridge and the rollers attached to the levers engage the tape and pull tape out of the cartridge. The roller supporting ends of the levers engage a lever guide member in such a fashion that the at least two levers move apart. In this manner, a suitable transducer mounted adjacent the lever guide member, can have tape wrapped around itself (less than 360°) for subsequent recording on or playback from the tape. This mechanism is suitable for use with an internal elastic-belt-drive cartridge; when used with such a cartridge, the reels of the cartridge must be driven in their normal manner when extracting tape from the cartridge. The cartridge must also be driven in its normal manner when tape is being fed back into the cartridge. This mechanism is also suitable for use with a non internal elastic-belt-drive cartridge.

15 Claims, 7 Drawing Figures

MECHANISM FOR EXTRACTING TAPE FROM A TAPE CARRIER

BACKGROUND OF THE INVENTION

This invention relates generally to the field of loading tape carriers into a machine for recording on or playing back from, the tape, and more particularly to a mechanism suited for loading tape cartridges of the internal belt-drive type wherein the tape must be pulled from the cartridges and wrapped around a suitable transducer. The mechanism can also be used with conventional tape cartridges or cassettes and is not limited to use solely with internal belt-drive type cartridges.

One cartridge of the internal elastic-belt-drive type is depicted in U.S. Pat. No. 3,692,255 dated Sept. 19, 1972 by R. A. Von Behren. In a cartridge of this type the tape is carried by two reels referred to generally as a "supply" reel and a "take-up" reel. The drive for the reels is provided by an "endless" elastic belt which contacts the tape on both reels with the result that by driving the belt, both the reels are also driven.

It is known in the art, when recording on and playing back from a tape, to draw a loop of tape from a conventional cartridge (i.e. not of the internal belt-drive type) and to wrap the tape around (less than 360°) a rotating transducer. U.S. Pat. No. 3,860,960 dated Jan. 14, 1975 by T. Akamine depicts one such system. Many other systems for withdrawing tape from cartridges and cassettes (referred to generally as tape carriers) exist in the art. The following U.S. patents depict but a few of those systems, and attention is directed to them: U.S. Pat. No. 4,045,820 dated Aug. 30, 1977 by T. C. J. L. Staar; U.S. Pat. No. 4,092,686 dated May 30, 1978 by G. Schulz; and U.S. Pat. No. 4,258,399 dated Mar. 24, 1981 by K. Iijima et al. IBM Technical Disclosure Bulletin Vol. 9, No. 8, January 1967 in an article on page 968 entitled "Automatic Tape Threading" by R. B. Johnson et al discloses yet another scheme for withdrawing tape from a cartridge.

These techniques of withdrawing tape from a cartridge work well with conventional cartridges, but pose problems when employed with cartridges of the internal belt-drive type. The reason for the difficulties with the internal belt-drive type cartridges is that it is difficult to withdraw the tape from that type of cartridge without damaging the tape. With an internal belt-drive type cartridge, when the tape is removed from one reel, the drive belt moves and consequently the other reel is also moved to accept tape; in other words, no appreciable slack can normally appear in the tape; certainly not enough slack to permit a loop of sufficient size to engage a transducer.

One solution to this problem is depicted in U.S. Pat. No. 4,275,424 dated June 23, 1981 by A. R. Maxey. The solution, according to that patent, is to provide a special cassette that holds a length of the tape proud of the reels in every access of a transducer. When the cassette is not in active use, a lever arm applies tension to the exposed length of tape, thereby partially withdrawing it into the cassette. When in active use, (i.e. in engagement with a transducer) the lever arm releases the tape allowing it to contact the transducer. The facts that the cassette includes a "cut-out" portion and that the tape contacts the transducer significantly less than 180° of tape turn also play a factor in this solution (see column 1, lines 48 and 49 of that patent).

One major drawback to such a solution is the need to use a special cassette.

It is one object of the present invention to withdraw tape from an internal belt-drive cartridge of standard manufacture (one example being a model DC-300A cartridge manufactured by the Minnesota Mining and Manufacturing Co., commonly referred to as 3M) and to wrap the tape so withdrawn around (less than 360°) a transducer.

SUMMARY OF THE INVENTION

The present invention is directed to a mechanism for withdrawing tape from a tape carrier such as an internal belt-drive type cartridge of standard manufacture, and wrapping same around a transducer (less than 360°). This is accomplished, according to the present invention, by inserting at least one member into the cartridge, just behind the tape, where the tape is exposed by the cartridge, and pulling on the tape, in a direction generally perpendicular to the undisturbed surface of the tape and simultaneously driving the reels of the cartridge in their standard manner.

Stated in other terms, the present invention is a mechanism for withdrawing tape from a tape carrier, the mechanism comprising: a boom member; a lever system; a lever guide means; roller means, supported by the lever system, for engaging the tape; and the lever system pivotally mounted to the boom member such that, as the boom member is moved generally away from the tape carrier and generally towards the lever guide means, at least two levers of the lever system engage the lever guide means and begin to separate, whereby tape is withdrawn from the tape carrier.

Stated in yet other terms, the present invention is a mechanism for withdrawing tape from a tape cartridge and wrapping the tape less than 360° around the curved portion of a cylindrical transducer means, the mechanism comprising: a pivotally mounted boom member; a lever system, pivotally mounted to the boom member, the lever system carrying a plurality of roller means for engaging the tape in such a manner that as the lever system is moved generally away from the tape cartridge and generally towards the transducer means, tape can be withdrawn from the cartridge; a lever guide means, mounted adjacent the transducer means, in a plane parallel to the plane through which the boom member and the lever system move, and extending beyond the transducer means such that the lever system engages the lever guide means and does not engage the transducer means; the lever guide means serves as a guide for the lever system and causes the lever system to separate when it engages the lever guide means, such that at least a first lever member moves along a first path defined by the lever guide means and at least a second lever member moves along a second path defined by the lever guide means; and the lever system engaging the lever guide means, in response to movement of the boom member.

Stated in still other terms the present invention is a mechanism for withdrawing tape from a tape cartridge, the mechanism comprising: a lever guide means; a boom member; a lever system, comprising a plurality of lever members, supported by the boom member; a drive means for moving the boom member about a pivot point, thereby moving the lever members generally away fron the tape cartridge and generally toward the lever guide means such that, when the lever members contact the lever guide means, the lever members separate such that at least a first lever member moves along a first path defined by the lever guide means and at least a second lever member moves along a second path defined by the lever guide means.

BRIEF DESCRIPTION OF THE DRAWINGS

The present invention will now be described in more detail with reference to the accompanying drawings, wherein like parts in each of the several figures are identified by the same reference character, and wherein.

DETAILED DESCRIPTION

Figure 1:
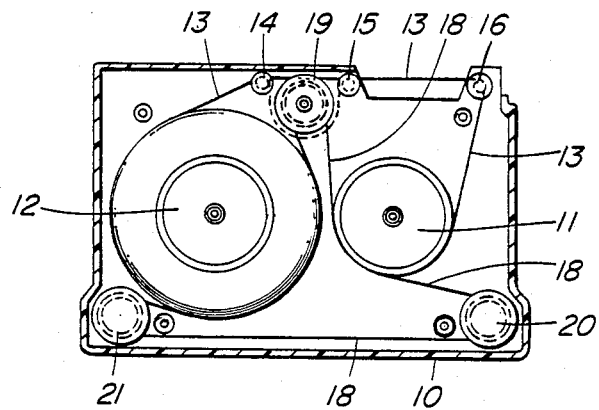
FIG. 1 is a simplified plan view of a cartridge of the internal elastic-belt-drive type suitable for use with the present invention.

FIG. 1 depicts a prior art tape cartridge of the internal elastic-belt-drive type; a type of cartridge with which the present invention is well suited to function. As the cartridge of FIG. 1 is well known in the prior art, it will not be discussed at great length.

Cartridge 10, of FIG. 1, contains two reels indicated as 11 and 12. The bulk of the tape is shown on reel 12. The path of the tape 13 between reels 11 and 12 is depicted. The tape 13 leaves reel 12, passes by rollers 14, 15, and 16 and returns to reel 11.

A flexible, elastic belt 18 is located, as shown in FIG. 1, around a driving roller 19, and rollers 20 and 21. It will be noted that belt 18 also contacts the outer surface of the tape contained on reels 11 and 12. When the driving roller 19 is rotated (by means not shown) the flexible belt 18 is caused to move. This in turn causes the reels 11 and 12 to rotate, thus taking tape from one of the reels and supplying it to the other reel.

Figure 2:
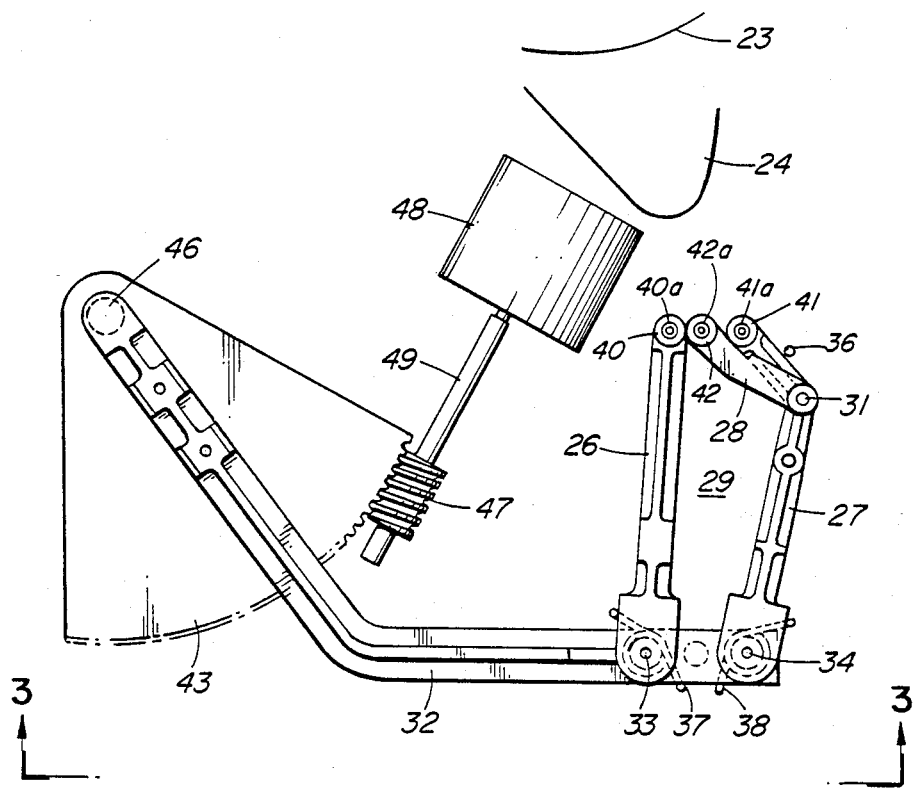
FIG. 2 is a simplified plan view of a mechanism constructed according to the present invention for withdrawing tape from a cartridge.
Figure 3:
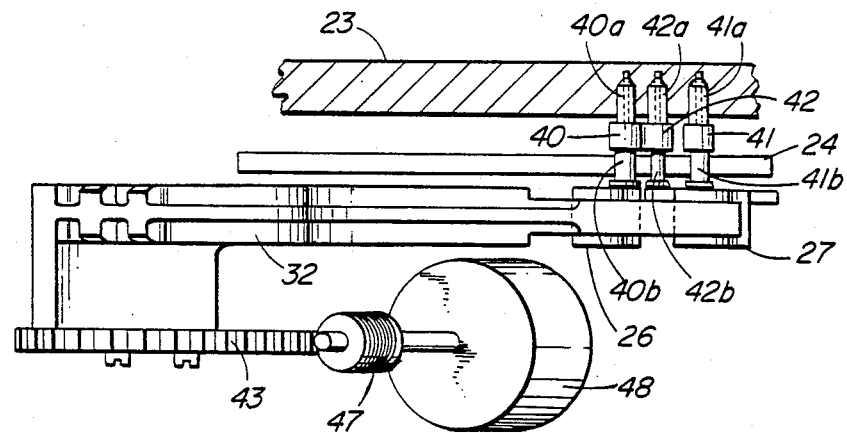
FIG. 3 is a simplified cross-sectional view of the mechanism of FIG. 2.

FIG. 2 depicts a simplified plan view of the preferred mechanism, according to the present invention, for withdrawing tape from a cartridge of the general type depicted in FIG. 1. FIG. 3 is a sectional view of FIG. 2, taken from the view 3—3 as depicted in FIG. 2; FIGS. 2 and 3 should be referenced together. It should, however, be noted that the mechanism of the present invention is also suited to withdrawing tapes from other cartridges or cassettes, of the non-internal belt-drive type, and is not limited to use only with internal belt-drive cartridges.

A rotating drum assembly 23 supporting two magnetic transducers (not shown) is shown mounted above a lever guide member 24. Levers 26, 27, and 28 form a lever system 29 depicted in its rest or unengaged position. Lever 28 is pivotally mounted to lever 27 by a pivot pin 31. Levers 26 and 27 are mounted to boom member 32 by pivot pins 33 and 34 respectively. Spring 36 biases lever 28 towards lever 27 as depicted in FIG. 2. Springs 37 and 38 bias levers 26 and 27, respectively, towards one another. Levers 26, 27 and 28 are depicted in FIG. 2 in their normally biased position, when at rest (i.e. with no tape withdrawn from the cartridge).

Figure 5:
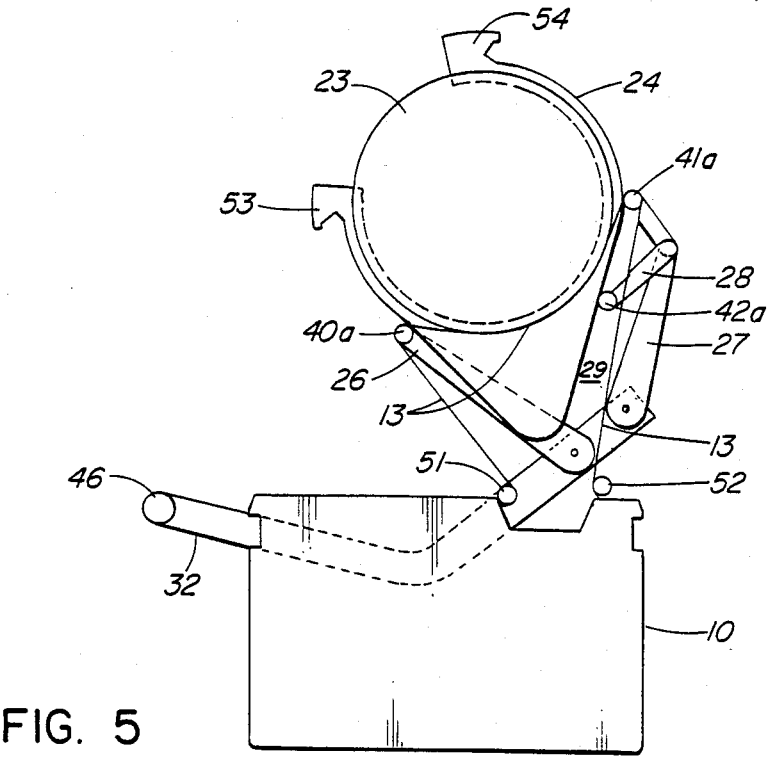
FIG. 5 is similar to FIG. 4, but depicts a loop of tape partially withdrawn from the cartridge.
Figure 6:
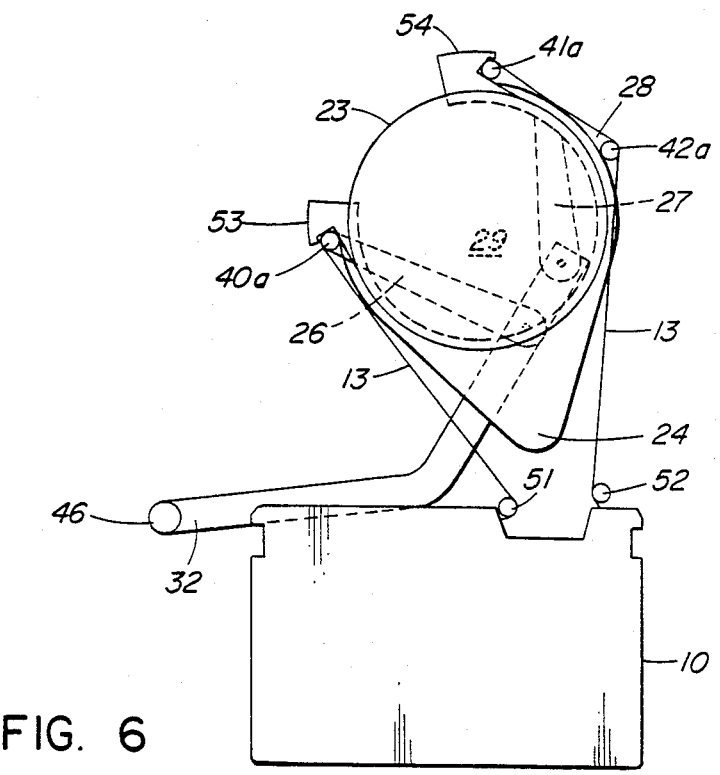
FIG. 6 is similar to FIG. 4, but depicts the loop of tape at the maximum extent of its extraction and wrapped around the rotating drum assembly.

Axle assemblies 40, 41, and 42 are mounted on the free ends of levers 26, 27, and 28 respectively as depicted. Rollers 40a, 41a, and 42a are mounted on axle assemblies 40, 41 and 42 respectively as depicted. The purpose of rollers 40a, 41a, and 42a is to engage the tape 13 (FIG. 1) to draw it out of the cartridge 10 (FIG. 1). The purpose of axle assemblies 40, 41, and 42 is to support the rollers 40a, 41a, and 42a, respectively, and also to engage lever guide member 24 to thereby become moved from their rest position and move about lever guide member 24 to thereby guide the tape 13 about a portion of drum assembly 23. This will become more apparent later, when FIGS. 4 to 6 are discussed.

It should also be noted that axle assemblies 40, 41, and 42 have recessed portions 40b, 41b, and 42b, respectively that are the areas that actually contact lever guide member 24. The purpose of these recessed portions 40b, 41b, and 42b is to limit any excessive up and down movement at the extremeties of levers 26, 27, and 28 that might otherwise exist.

Boom member 32 is securely attached to a worm gear 43. Boom member 32 and worm gear 43 move together about pivot pin 46. Worm 47, driven by motor 48 via coupling 49, engages worm gear 43 and causes worm gear 43, and consequently boom member 32 to pivot about pivot pin 46, in the plane of the Figure. This results in lever system 29 moving towards lever guide member 24, which will be described later in more detail.

Figure 4:
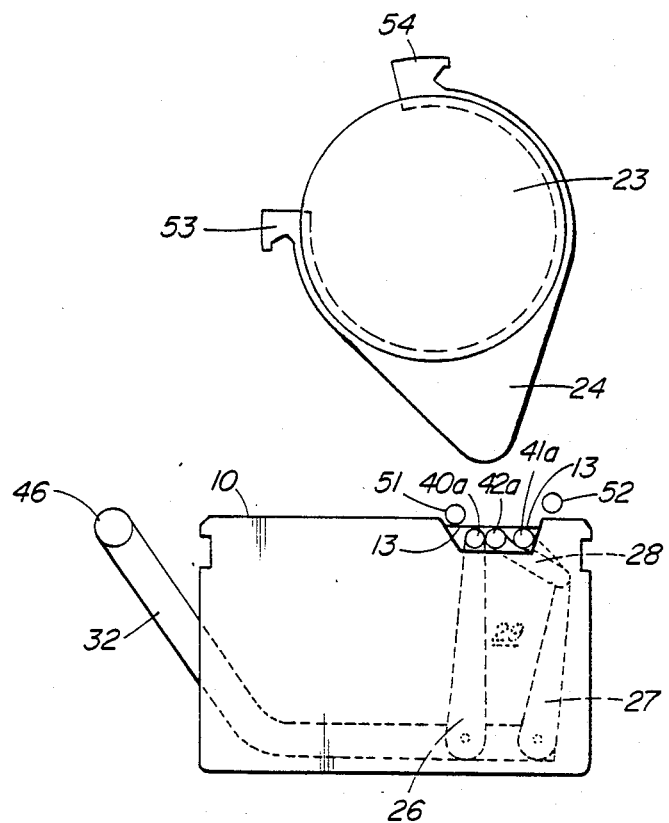
FIG. 4 is a simplified plan view of the mechanism of FIG. 2 in cooperation with the cartridge of FIG. 1, depicted in the retracted position.

FIG. 4 is a simplified plan view of the mechanism of the present invention depicting its interaction with a cartridge 10. Drum assembly 23 and cartridge 10 are in approximately the same plane. Boom member 32 is situated underneath the cartridge 10 and lies in a plane approximately parallel to the plane in which the cartridge is situated. Levers 26, 27, and 28 are also located under cartridge 10 and lie in approximately the same plane as does boom member 32. Rollers 40a, 41a, and 42a protrude into a recess provided in cartridge 10, as shown. This enables rollers 40a, 41a, and 42a to be situated behind tape 13. In other words, tape 13 is located between rollers 40a, 41a, and 42a and drum assembly 23. Rollers 51 and 52 are also depicted. They are shown in greater detail in FIG. 7.

FIG. 5 is similar to FIG. 4, but shows the lever system 29 engaging lever guide member 24 and shows some tape 13 withdrawn from cartridge 10. When boom member 32 is pivoted toward lever guide member 24 (as depicted in FIG. 5) levers 26, 27, and 28 are moved towards lever guide member 24 also, withdrawing some tape 13 in the process. When recessed portions 40b, 41b, and 42b (FIG. 3) come into contact with lever guide member 24, they separate as depicted. Roller 40a moves to the left of lever guide member 24 while rollers 41a and 42a move to the right of lever guide member 24. Additionally, rollers 41a and 42a separate as depicted.

As can be seen from FIG. 5, tape 13 is being brought into contact with drum assembly 23. Rollers 51 and 52 act as guide rollers to prevent the tape 13 from scuffing against the sides of cartridge 10. Rollers 51 and 52 are also part of a tension sensing mechanism to be described more fully in reference to FIG. 7.

FIG. 6 is similar to FIG. 5, but shows the lever system 29 at the limit of its travel, with recessed portion 40b against stop 53 and recessed portion 41b against stop 54. As can be seen in FIG. 6, levers 26, 27 and 28 are located underneath lever guide member 24. Tape 13 is wrapped around drum assembly 23 from approximately roller 40a to approximately roller 41a. Roller 42a serves to keep the portion of tape 13 in its area clear of the tape already in contact with drum assembly 23. It should be noted that rollers 40a, 41a, and 42a also serve to allow tape 13 to move with a minimum of resistance.

It should also be noted that, in order to draw tape 13 out of an internal elastic-belt-drive cartridge, the reels of the cartridge must be driven, in their normal fashion, all the while that the tape is being withdrawn. If the reels of the cartridge are not driven, there is too much resistance to allow the tape to be extracted without damage.

To introduce tape 13 back into cartridge 10 (i.e. tape retraction), the opposite operation to extraction occurs. Boom member 32 is pivoted back to its rest position as depicted in FIG. 4. Note that while boom member 32 is being returned to its rest position the reels of cartridge 10 must be driven in order to take up the slack in tape 13 that will occur.

Note that when the mechanism of the present invention is used with a non internal belt-drive cartridge, the reels do not have to be driven, but at least one reel having tape stored thereon must be free to turn to allow tape to be extracted. Similarly, on returning the tape to the non internal belt-drive cartridge, at least one reel must be driven to accept the tape as it is given up by lever system 29.

Figure 7:
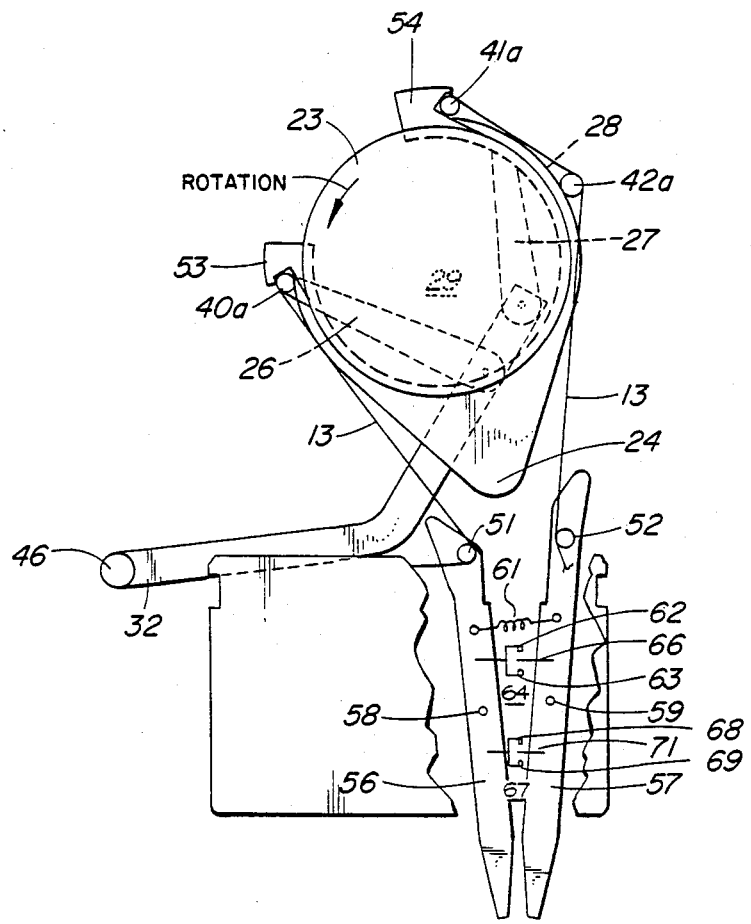
FIG. 7 is similar to FIG. 6, but additionally depicts a tension sensing mechanism.

FIG. 7 is similar to FIG. 6 except that tension arms 56 and 57, along with their associated equipment are additionally depicted. Note that rollers 51 and 52 are mounted on tension arms 56 and 57 respectively. Tension arms 56 and 57 are mounted below cartridge 10 so as to pivot about pivot pins 58 and 59 respectively. Spring 61 is used to bias together the ends of tension arms 56 and 57, carrying capstans 51 and 52.

Light source 62 (i.e. a light emitting diode, LED) and light detector 63 (e.g. a photo diode) form a light sensor 64 which, together with projection 66, provide an indication of the tension in tape 13.

As shown in FIG. 7, optical sensor 64 is mounted on tension arm 56 and projection 66 is mounted on tension arm 57. When the tension in tape 13 is below a predetermined maximum limit (e.g. 8 ounces) projection 66 protrudes (as shown in FIG. 7) between light source 62 and light detector 63. This of course prevents the light from light source 62 reaching light detector 63 and the output of optical sensor 64 is in a first state. This first state indicates that the tension in tape 13 is below the maximum limit and motor 48 (FIG. 1) is enabled to move boom member 32 toward lever guide member 24 (during the tape extraction process).

As the tension in tape 13 increases, the action of tape 13 on rollers 51 and 52 causes the two rollers to move apart. This results in lever arms 56 and 57 moving apart also such that projection 66 no longer prevents the light of light source 62 from reaching light detector 63. This results in the output of optical sensor 64 being in a second state. This second state indicates that the tension is too great and motor 48 (FIG. 2) is disabled until the tension comes within limits. Note that although motor 48 (FIG. 2) is stopped for this condition, the reels of tape cartridge 10 are still driven (for an internal belt-drive cartridge) so as to allow the tension in the tape to decrease.

Note that the maximum tension limit is chosen such that the tension applied to the tape is greater than the normal equilibrium tape tension of the cartridge (e.g. approximately 3 ounces), but below the safe yield limit of the tape. A maximum tension limit of approximately 8 ounces has been selected to meet these criteria for an internal belt-drive cartridge.

Optical sensor 67, comprised of light source 68 and light detector 69, functions to provide detection of the lower tension limit of the tape. Optical sensor 67 is mounted to tension arm 56 and a projection 71 is mounted on tension arm 57. When the tension in tape 13 is above a predetermined minimum limit (e.g. 2 ounces) projection 71 protrudes (as shown in FIG. 7) between light source 68 and light detector 69. This of course prevents the light from light source 68 reaching light detector 69 and the output of optical sensor 67 is in a first state. This first state indicates that the tension in tape 13 is above the lower limit and motor 48 (FIG. 2) is enabled to move boom member 32 toward (or away from) lever guide member 24 (during the tape extraction or retraction process).

As the tension in tape 13 decreases, the action of tape 13 on rollers 51 and 52 allows the two rollers to move together (due to the bias action of spring 61). This results in lever arms 56 and 57 moving apart, in the vicinity of optical sensor 67 and projection 71, such that projection 71 no longer prevents the light of light source 68 from reaching light detector 69. This results in the output of optical sensor 67 being in a second state. This second state indicates that the tension is too low and motor 48 (FIG. 2) is disabled (for a tape retraction process) until the tension comes within limits. Note that although motor 48 (FIG. 2) is stopped for this condition (in the tape retraction mode) the reels of tape cartridge 10 are still driven. In the tape extraction mode, if a low tape limit is encountered (i.e. the output of optical sensor 67 is in its second state) the drive motor (not shown) for the reels of the tape cartridge is inhibited and motor 48 is allowed to continue running. This allows tape tension to increase.

Note that the minimum tension limit is chosen such that the tension applied to the tape is less than the normal equilibrium tape tension of the cartridge (e.g. approximately 3 ounces), so as to enable the tape to be retracted into the cartridge during the retraction mode. The tape tension cannot be allowed to go too low or the tape will not return to the reels properly. A minimum tension limit of approximately 2 ounces has been selected to meet these criteria for an internal belt-drive cartridge.

In an experimental model, the tape speed employed during the extraction process was a nominal 60 inches per second and tape was extracted from the cartridge at the ratio of approximately 1:100 (i.e. 1 inch of tape was extracted for every 100 inches of tape moved in the cartridge). The cartridge employed was a 3M model DC-300A.

What is claimed is:
1. A mechanism for withdrawing tape from a tape carrier and to carry the tape to form a path about a portion of a transducer, said mechanism comprising:
   a movable boom member;
   a lever system comprising at least two levers;
   a lever guide means for contacting each of said at least two levers and defining a path for said levers to follow, said lever guide means being spaced from said tape carrier;
   roller means, supported by each said lever, for engaging said tape; and said two levers each being pivotally mounted to said boom member, means for moving said boom member so that as said boom member is moved generally away fronm said tape carrier and generally towards said lever guide means said roller means engages said tape to withdraw it from the tape carrier and said at least two levers engage said lever guide means and begin to become separated by said lever guide means to carry tape peripherally about the transducer.

2. The mechanism of claim 1 further including a resilient means for biasing said roller means towards one another, such that, when said boom member is moved away from said lever guide means, said roller means are brought into close proximity with one another.

3. The mechanism of claim 2 wherein there are two levers mounted to said boom member and wherein said second levers supports a third lever.

4. The mechanism of claim 3 wherein each said lever supports a roller at its free end.

5. The mechanism of claim 1 wherein said lever guide means is generally cam shaped and extends through a path to be followed by said levers.

6. A mechanism for withdrawing tape from a tape cartridge and wrapping said tape less than 360° around the curved portion of a cylindrical transducer means, said mechanism comprising:
a pivotally mounted boom member;
a lever system having at least two levers pivotally mounted to said boom member, each said lever carrying a roller means for engaging said tape in such a manner that as said lever system is moved generally away from said tape cartridge and generally towards said transducer means, tape can be withdrawn from said cartridge;
a lever guide means, mounted adjacent said transducer means, in a plane parallel to a plane through which said boom member and said lever system move, said guide means having a guide surface for engagement with said lever system, said guide surface extending peripherally about said transducer means such that said lever system engages said guide surface and does not engage said transducer means;
means for moving said boom member so that said guide surface acts as a guide for said two levers and causes said levers to separate when it engages said guide surface such that at least a first lever moves along a first path defined by said lever guide means and at least a second lever moves along a second path defined by said lever guide means.

7. The mechanism of claim 6 wherein said tape cartridge is of the internal belt-drive type.

8. The mechanism of claim 6 wherein there are two levers mounted to said boom member and wherein said second lever supports a third lever.

9. The mechanism of claim 8 wherein each said lever supports one roller at its free end.

10. The mechanism of claim 6 wherein said lever guide means is generally cam shaped and extends around the portion of said transducer to define a path to be followed by said roller means.

11. A mechanism for withdrawing tape from a tape cartridge, said mechanism comprising:
a lever guide means;
a boom member;
a lever system, comprising a plurality of lever members for engaging and carrying the tape to form a path about a portion of a transducer, said lever members being supported by said boom member on a first portion of said boom member;
a drive means for moving said boom member about a pivot point located a remote distance from said first portion, thereby moving said lever members generally away from said tape cartridge and generally toward said lever guide means such that, when said lever members contact said guide means, said lever members separate such that at least a first lever member moves along a first path defined by said lever guide means and at least a second lever member moves along a second path defined by said lever guide means.

12. The mechanism of claim 11 wherein there are two lever members supported by said boom member and wherein said second lever member supports a third lever member.

13. The mechanism of claim 12 wherein each said lever member supports a roller at its free end.

14. The mechanism of claim 11, 12, or 13 further including a tape tension sensing means for monitoring the operation of said drive means.

15. The mechanism of claim 13 wherein said lever guide means is a planar sheet of material, generally cam-shaped.

* * * * *